United States Patent Office 3,200,079
Patented Aug. 10, 1965

3,200,079
DETERGENT COMPOSITION NON-CORROSIVE TO METAL SURFACES
Louis A. Joo, Crystal Lake, Walter E. Kramer, Niles, and Robert C. Kimble, Crystal Lake, Ill., assignors to The Pure Oil Company, Chicago, Ill., a corporation of Ohio
No Drawing. Filed Oct. 6, 1961, Ser. No. 143,313
10 Claims. (Cl. 252—161)

This invention relates to a novel class of corrosion inhibitors comprising complex polybasic acids derived from solvent extracts obtained in the solvent extraction of mineral lubricating oils, and salts of said complex polybasic acids. More particularly, this invention relates to a novel class of corrosion inhibitors for aerated aqueous media, especially aerated solutions of commercial detergent compositions, wherein said inhibitors comprise polycarboxylic acids derived from solvent extracts by metalation, carbonation and acidification, and salts of said acids, which are characterized by having organic nuclei derived from said solvent extracts wherein said nuclei are essentially complex, high-molecular-weight, polynuclear aromatic, alkyl aromatic, and heterocyclic organic groups, or mixtures of such groups.

Specifically, the complex acids referred to herein as "extract acids" have the following formulae:

(1) $R(COOH)_n$
(2) $R(COOM)_n$
(3)

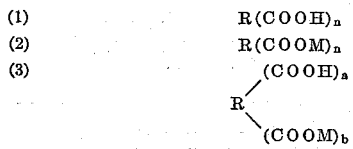

wherein R represents complex organic polynuclear nuclei derived from solvent extracts obtained in the solvent extraction of mineral lubricating oils, $n$ has a value of 1 to 5 or more, M is a metal, and, in Formula 3, $a+b=n$, these being partial salts.

It becomes therefore a primary object of this invention to provide a new class of corrosion inhibitors.

An object of this invention is to provide a new class of corrosion inhibitors for aqueous environments.

An object of this invention is to provide a corrosion-inhibiting composition.

Another object of this invention is to provide a new class of corrosion inhibitors for aerated aqueous environments.

A further object of this invention is to provide a new class of corrosion inhibitors or antioxidants for aerated aqueous solutions of commercial detergents.

An object of this invention is to provide a new class of corrosion inhibitors of the Formulae 1, 2, or 3, supra.

Still another object of this invention is to provide a new class of corrosion inhibitors comprising carboxylic acids and their salts derived from solvent extracts by metallation and carbonation, or by metalation, carbonation, acidification, or by metalation, carbonation, acidification, and total or partial neutralization.

These and other objects of this invention will be described or become apparent as the specification proceeds.

A feature of this invention is the discovery that a free complex acid and the salt thereof, as herein more fully defined, is a corrosion inhibitor when organic acids in general, and most organic acid salts, are not corrosion inhibitors. Another feature of this invention is that the new class of corrosion inhibitors described herein are effective at low concentration, i.e., in the order of 0.1 to 0.001 g./100 ml. of solution.

Without limiting the invention, the reaction product of solvent extracts with an alkali metal, followed by carbonation, has been found to produce acids and salts which are characterized by having aromatic nuclei of the naphthalene, phenanthrene and anthracene type with several alkyl substituents on each aromatic nucleus, and also having heterocyclic nuclei containing sulfur, nitrogen, or oxygen associated therewith. The acids contain from one to five carboxyl groups and predominate in molecules containing two carboxyl groups. The term polybasic or polycarboxylic as used herein is intended to mean as many as five carboxyl groups.

The acids are more accurately described as dihydrocarboxylic acids since there is a change in structure with the introduction of the carboxyl groups. A simplified structure, not showing the numerous alkyl substituents or the heterocyclic nuclei, and the relative percentage of each structure may be:

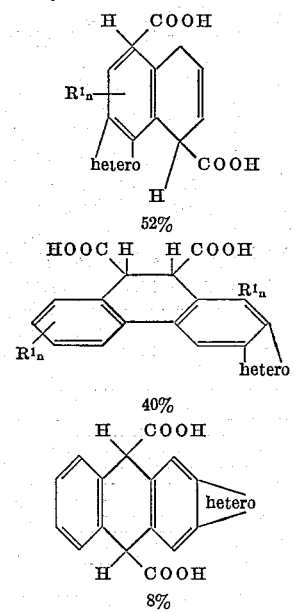

where $R^1$ comprises alkyl substituents having a sum of about 15 to 22 carbon atoms in each formula, $n$ is the number of such alkyl groups, which may be from 3 to 10, and "hetero" illustrates one or more S-, N-, or O- containing heterocyclic rings in the molecule. The molecular weight of the acids ranges from 300 to 600 and the average from 325–450.

The following Table I gives the physical properties of typical extract acids:

TABLE I.—PHYSICAL PROPERTIES OF EXTRACT ACIDS

| Property: | Value |
|---|---|
| Acid number | 200–280 |
| Melting points, ° C. | 80–90 |
| Bromine No. | 16–24 |
| Percent sulfur | 1.7–2.3 |
| Color | Deep red |
| Percent unsaponifiables | 2–6 |

The method of preparation of these complex, polynuclear, high-molecular-weight, alkylaryl, aryl, or heterocyclic, acids is described in copending application Serial Number 819,932, filed June 12, 1959, now abandoned and application Serial Number 79,661, filed December 30, 1960, now United States Patent No. 3,153,087. Although the acids may be prepared by the various known methods in the prior art for converting aromatic materials to carboxylic acids, such as are described in said copending applications using solvent extracts as starting materials, the technique set forth in said later application represents a preferred method of preparation because of the increased efficiency of the process and the higher yields of acid of high purity that are obtained. The starting materials for the reaction are well-known by-products of the solvent extraction of mineral lubricating oils, and are adequately described as those aromatic materials separated from mineral lubricating oils and their fractions, i.e., those aromatics obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used, and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the lubricating oil constituents and leaves the asphaltic materials. A typical vacuum residuum charge to the propane-deasphalting unit may have an API gravity of 12.9°, viscosity (SUS at 210° F.) of 1249, flash 585° F., fire 650° F., C.R. of 13.9 weight percent, and may be black in color. The deasphalted oil may have an API gravity of 21.5° to 21.8°, viscosity (SUS 210° F.) of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light and a heavy lubricating distillate. The vacuum residue was a crude having a viscosity of 1251 SUS at 210° F., 2.2 percent total sulfur, and an API gravity of 12.6. After propane-deasphalting, the oil had a viscosity of 174 (SUS at 210° F.) and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product from which the corrosion-inhibiting acids and salts of this invention are made. For example, liquid sulfur dioxide, nitrobenzene, Chlorex, chlorophenol, cresylic acid, furfural, or the Duo-Sol solution (comprising liquid propane and cresol) can be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which can be used in accordance with this invention.

TABLE II.—SOURCES AND PHYSICAL CHARACTERISTICS OF SOLVENT EXTRACTS

| Ext. No. | Crude source | Solvent | API grav. | Vis./100° F., secs. | Vis./130° F., secs. | Vis./210° F., secs. | V.I. °F. | Pour, °F. | Flash, °F. | Fire, °F. | C.R., percent | Total sulfur percent |
|---|---|---|---|---|---|---|---|---|---|---|---|---|
| 1 | East Tex | Phenol | 11.1 | 23,319 | 4,750 | 282 | −40 | +55 | | | 7.2 | 2.60 |
| 2 | do | do | 15.4 | 15,000 | | 285 | +39 | | | | | |
| 3 | do | do | 12.6 | 36,410 | 4,310 | 310.1 | −1 | +80 | | | 4.7 | 2.27 |
| 4 | do | do | 14.6 | 19,500 | 4,305 | 313 | +27 | +90 | | | 4.7 | 2.2 |
| 5 | do | do | 15.4 | 32,500 | | 372 | +5 | +60 | | | 4.13 | 2.33 |
| 6 | do | do | 13.7 | 25,000 | 5,400 | 355 | +27 | +80 | | | | 2.18 |
| 7 | do | do | 8.6 | 145,000 | 19,000 | 616 | 0 | +70 | | | | |
| 8 | do | do | 10.5 | 12,676 | 2,514 | 172.1 | −101 | +60 | | | | 2.18 |
| 9 | Santa Fe Springs | do | 10.2 | | | 371 | | +65 | 520 | 600 | | |
| 10 | Texas | Furfural | 13.0 | | | 1,500 | | +85 | 470 | 515 | | |
| 11 | Penn | Chlorex | 12.2 | | | 1,365 | | +85 | 560 | 630 | | |
| 12 | do | Nitrobenzene | 10.0 | | | 1,500 | | +75 | 555 | 640 | | |
| 13 | Mid-Cont | Propanecresol | 14.4 | | | 1,500 | | +100 | 540 | 605 | | |
| 14 | do | Phenol | 13.6 | | | 41.7 | −82 | +20 | | | | |
| 15 | do | Chlorex | 13.6 | | | 200 | −61 | +75 | | | | |
| 16 | do | Phenol | 8.9 | | | 569 | | +75 | | | | |
| 17 | do | Furfural | 14.9 | | | 50.2 | 25 | +20 | | | | |
| 18 | East Tex | Phenol | 13.5 | 25,000 | | 341 | 17 | +65 | 530 | 610 | 5.76 | 2.36 |
| 19 | do | do | 11.1 | 1,054 | 331 | 61.5 | −56 | +40 | 435 | 475 | 0.42 | 2.7 |
| 20 | do | do | 13.7 | 26,000 | 5,615 | 360 | +25 | +65 | 550 | 630 | 5.5 | 2.3 |
| 21 | do | do | 7.7 | 2,007 | 611 | 71.1 | −128 | +35 | 420 | 495 | 0.86 | 3.2 |
| 22 | do | do | 7.3 | 230,000 | 20,800 | 796 | −76 | +65 | 520 | 610 | 7.7 | 3.0 |
| 23 | do | do | 17.6 | 154 | 80 | 41 | 11 | +30 | 400 | 435 | 0.1 | 2.0 |

Extract No. 19 was obtained in the production of 170 vis. neutral, had an average molecular weight of 340, contained 87.0% aromatics, and 13% saturates, and averaged 2.7 aromatic rings per aromatic molecule. Its ultimate analysis was: 86.4% carbon, 10.7% hydrogen.

Extract No. 20 was obtained in the production of 150 vis. Bright Stock, had an average molecular weight of 590, and contained 86% aromatics, 14% saturates, and averaged 3.3 aromatic rings per aromatic molecule. Its ultimate analysis was: 86.2% carbon, 11.4% hydrogen.

Extract No. 21 was obtained in the production of 200 vis. neutral, had an average molecular weight of 340, and contained 87% aromatics and 13% saturates.

Extract No. 22 was obtained in the production of 160 vis. Bright Stock, and contained 92% aromatics and 8% saturates.

Extract No. 23 was obtained in the production of 85 vis. neutral, had an average molecular weight of 300, and contained 76.8% aromatics (by the silica gel procedure).

The solvent extracts from lubricating oils used as starting materials for this invention have the following general properties and characteristics:

TABLE III

| Characteristic: | Range of value |
|---|---|
| Gravity, ° API | 7.0–18.3 |
| Specific gravity, 60° F./60° F. | 0.945–1.022 |
| Viscosity, SUS @ 210° F. | 40–1,500 |
| Viscosity index | −128–+39 |
| Pour point (max.), ° F. | +30–+100 |
| Molecular weight, average | 300–750 |
| Boiling point, ° F. | Above 600 |
| Total sulfur, percent wt. | 0.5–4.5 |
| Sulfur compounds, percent wt. | 5–45 |
| Aromatic hydrocarbons | 25–90 |
| Av. No. of rings aromatic mean arom. mol. | 1.7–3.5 |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of high-viscosity-index neutral oils, the viscosities of the extracts increase with increase in stated viscosities of the neutral oils, raffinates). The pour points of extracts are high and are affected by changes in the depth of extraction. The sulfur contents are also affected by the depth of extraction. The solvent extracts are characterized by containing aromatic and sulfur compounds in the range of 70–95%, the remainder being principally saturates, or material behaving as saturates, together with a minor proportion of from 0.5 to 6.0% of organic acids. The organic acids present are not susceptible to extraction by the use of aqueous strong caustic because of the solubilities of the salts of the acids in the oil. Very little, if any, asphaltic material is present in solvent extracts and they contain no materials volatile at room temperatures.

The materials shown in Tables II and III are merely illustrative of the starting materials and the invention not to be limited thereby.

It is apparent that the composition and characteristics of the acids and salts will vary somewhat depending on the concentration and types of polynuclear aromatic compounds in the solvent extracts used. In such complicated mixtures as solvent extracts from lubricating oil fractions, the content of aromatic materials may vary from about 25% to 90% by weight. This variation in aromatic content affects the yield of acids and salts prepared therefrom, but not the quality or corrosion-inhibiting characteristics of the acids or salts. The general method of preparing the acids and salts to be used as corrosion inhibitors in accordance with this invention is adequately described in said copending applications, and since this invention is not directed to the method generally, the method is described briefly followed by a description of certain of the end products specifically in a number of examples.

The carboxylic acids are prepared by reacting about 30 parts of solvent extract with about 1 to 5 parts of an alkali metal in elementary form at a temperature of about $-60°$ C. to $80°$ C., in the presence or absence of a so-called "reaction solvent," namely, dimethyl glycol ether, dimethyl ether, methyl alkyl ether, tetrahydrofuran, and trimethylamine. The alkali metal may be in the form of a mixture or alloy. To prevent the formation of a coating on the alkali metal surface, which impedes the reaction, several expedients are used, including the application of continuous shearing, use of a large excess of alkali metal, use of a preformed alkali metal dispersion in an inert liquid, and the use of a performed dispersion of the alkali metal in a portion of the solvent extract.

When the first step of the reaction, the metalation, is complete, as evidenced by the dissolution of the alkali metal and the formation of the deep blue color of the adduct, the reaction mixture is treated with carbon dioxide in solid or gaseous form at a temperature of about $-60°$ C. to $80°$ C. The carbonation reaction, with the formation of the alkali metal salts of the corresponding carboxylic acids, proceeds rapidly without difficulty. The reaction with carbon dioxide is known to be completed with the dissipation of the blue color of the adduct, and the mixture is next washed with water and allowed to separate into an oil phase and a water phase. The water phase is acidified with a mineral acid, e.g., sulfuric, hydrohalic or phosphoric, and the carboxylic acids separate from the acidified solution.

*Example I*

A mixture of acids from aromatic extract oil, derived from a petroleum lube oil stock by phenol extraction in the preparation of 170 vis., 100 V.I. neutral oil, was prepared by the following procedure. A solution of 100 g. of aromatic oil in 675 cc. of dry tetrahydrofuran was placed in a 2100-cc. flask equipped with a Brookfield counter-rotating stirrer and gas-inlet and -outlet. The solution was cooled and maintained at 10–30° C. while 8.3. g. of metallic sodium in the form of $\frac{5}{16}''$ cubes were added, after which cooling was maintained during a two-hour reaction period. No complex formation appeared to occur until approximately 25 minutes had elapsed. Thereafter, a strong color change was noted and the reaction appeared to proceed relatively rapidly.

After stirring for two hours, the mixture was cooled to $-60°$ C. while an excess of carbon dioxide gas was introduced. The color was discharged by reaction with carbon dioxide, but no precipitation was noted. The unreacted sodium (5.1 g.) was removed, the tetrahydrofuran was stripped from the reaction mixture by applying a vacuum, after which the remaining liquid was combined with ether and washed with water.

The resulting aqueous phase was acidified and washed with ether to recover the free acids and other reaction products. About 89% w. of the original oil feed stock was recovered, and about 11% had reacted to form the acidic product to be used in accordance with this invention. The product had an indicated average molecular weight of 686 and a saponification value of 171. The calculated equivalent weight was 328 indicating an average of 2.1 acid groups per molecular. However, the true average molecular weight probably was somewhat lower than 686, the indicated average molecular weight being higher than actual because of molecular association in the benzene solvent during its determination. Extract No. 18 of Table I was used in this example.

*Example II*

One hundred gms. of solvent extract and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained. Approximately 100 gms. of Alundum balls $\frac{5}{16}''$ diameter were charged, and agitation was started. The solution was cooled to $-20°$ C. and 8.3 gms. of sodium (as a 20% dispersion in toluene) were added. After 5 minutes, no reaction had occurred, and the solution was allowed to warm. After 25 minutes, the temperature had risen to $-7°$ C. and a few particles of sodium appeared to be reacting, i.e., the deep color of the complex was seen to be forming on the surface of a few particles when agitation was momentarily stopped. Within an additional 17 minutes, the reaction was proceeding smoothly and the dry carbon dioxide atmosphere was introduced to the flask in excess, at $-18°$ C., over a period of 78 minutes. The reaction mixture was worked up as in the previous example after the excess sodium was destroyed with water. Hydrogen evolution from the remaining sodium indicated that only 48% of the sodium had reacted. Approximately 84.5% of the oil recovered, indicating 15.5% had reacted. The acids recovered weighed 22.5 gms. and had a saponification value of 241, indicating an equivalent weight of 233, and contained 2.8% sulfur. With a similar experiment, the acids recovered had a saponification value of 323, indicated 173 equivalent weight, with an indicated average molecular weight (cryoscopic) of 600. They contained 3.0% sulfur. The ratio of molecular weight to equivalent weight was 3.4, indicating a mixture containing acids with more than 2 acid groups per molecule. Extract No. 18 of Table I was used in this example.

*Example III*

One hundred gms. of Extract Oil No. 19 (Table I) and 675 ml. of dry tetrahydrofuran were charged to a one-liter, 3-necked flask equipped with a stirrer, thermometer, pressure-equalized dro-funnel, gas inlet with rotometer, and gas outlet. A dry nitrogen atmosphere was maintained in the flask. Approximately 100 gms. of Alundum balls, 5/16″ in diameter, were charged and agitation was started. The solution was cooled to −20° C. and 8.3 gms. of sodium (as a 20% dispersion in toluene) were added. After an induction period of about 5 minutes, the solution was warmed, and at −7° C. the reaction began; in 16 minutes it was proceeding rapidly. An excess of dry carbon dioxide was added at −18° C. over a period of 78 minutes. The reaction mass was worked up as in Example I after the excess sodium was destroyed with water. About 15% of the extract oil reacted, and 22.5 gms. of acid were recovered having a saponification value of 241, indicating an equivalent weight of 233. The acid product contained 2.8% sulfur.

*Example IV*

The process of Example III was repeated, producing complex acids having a saponification value of 323, indicated equivalent weight of 173, indicated average molecular weight (cryoscopic) of 600, and containing 3.0% sulfur. The ratio of molecular weight to equivalent weight was 3.4, indicating a mixture containing acids with more than two carboxyl groups per molecule.

*Example V*

The various recovered acids of application Serial No. 819,932, illustrated in Table II therein, are further examples of the carboxylic acids to be used as corrosion inhibitors in free or salt form in accordance with this invention.

*Example VI*

The various carboxylic acid products described in Runs 12 through 63 of application Serial No. 79,661 are further examples of acids that may be used.

*Example VII*

One hundred-fifty grams of extract oil and 12.5 g. of metallic sodium were charged to a dispersion flask and heated to 160° C. under a nitrogen atmosphere. When the proper temperature had been reached, the stirrer was turned on to make the dispersion. After four minutes of running, the stirrer was turned off and the dispersion was cooled to 20° C. Nine hundred milliliters of anhydrous tetrahydrofuran were then added, and the mixture was stirred to dissolve the oil. At this point, the solution had a black color. It was rapidly cooled to −25° C. and maintained at that temperature for 25 minutes. Then the reaction mixture was instantaneously carbonated by being poured onto a large quantity of Dry Ice.

After the excess carbon dioxide had been removed from the reaction mixture, the unreacted sodium was removed by centrifugation, and the tetrahydrofuran was stripped off, leaving a solid residue. This residue was washed several times with hexane to obtain substantially pure sodium salts of the "extract acids" as a yellow powder. This material was tested as a corrosion inhibitor, with the results tabulated in Table IV.

*Example VIII*

The copper salts of the "extract acids" were prepared by dissolving 200 g. of the sodium salts (prepared in accordance with Example VIII) in water, warming the solution to 70° C., and slowly adding 108 g. of anhydrous cupric chloride ($CuCl_2$). The copper salt of the extract acids, which precipitated as a greenish powder, was recovered by filtration, and was washed several times with water to remove the sodium chloride and obtain substantially pure copper salt. This salt was tested as a corrosion inhibitor in an aqueous solution of "Tide," with the results shown in Table IV.

*Example IX*

The mercury salts of the "extract acids" were prepared by dissolving 200 g. of the sodium salts (prepared in accordance with Example VII) in water, warming the solution to 70° C., and slowly adding 270 g. of mercuric nitrate ($HgNO_3 \cdot 2\frac{1}{2}H_2O$). The mercury salt of the acids, which precipitated from solution, was removed by filtration, and the filter cake was washed several times with water to remove the sodium nitrate. The product, which was in the form of a yellow powder, was tested as a corrosion inhibitor with the results shown in Table IV.

The effectiveness of these complex salts as inhibitors has been demonstrated by a series of experiments in aqueous solutions of "Tide," a mixed alkylaryl sulfonate. First, a water solution of "Tide" (0.5 g. detergent/100 ml. water) was prepared and divided into several flasks. Then portions of the sodium, mercury, and copper salts of "extract acids" were added to several of the solutions in an amount equivalent to 0.1 g./100 ml. of solution. However, because the mercury and copper salts were only sparingly soluble in water, not all of the salt added became dissolved. We estimate that the actual concentrations of these salts in solution was about 0.01 g./100 ml. Finally, two brass strips (½″ x 3″) were immersed in the solutions in each flask, and air was bubbled through the solutions at a rate of 10–15 ml./min. for a period of 72 hours while the temperature was maintained at 70° C. The weight losses from the brass strips were as follows:

TABLE IV.—EVALUATION OF "EXTRACT ACID" SALTS AS CORROSION INHIBITORS

| Inhibitor | Weight loss [1] (g.) | Inch/yr. |
|---|---|---|
| None | 0.0163 | 0.0048 |
| Sodium salt of extract acids (Ex. VII) | 0.0094 | 0.0003 |
| Copper salt of extract acids (Ex. VIII) | 0.0062 | 0.0002 |
| Mercury salt of extract acids (Ex. IX) | 0.0009 | 0.0000 |

[1] Average of two coupons.

The effectiveness of the free complex acids as inhibitors was next demonstrated by a series of experiments with aqueous solutions of "Tide." First, a water solution of "Tide" (0.5 g. detergent/100 ml. water) was prepared and divided into several flasks. The portions of "extract acid," from the foregoing examples, or fractions thereof derived in accordance with the following examples, were added to the solutions in amounts equivalent to 0.1 g./100 ml. of solution. However, because the acids were only sparingly soluble in water, they did not dissolve completely. We estimate that the actual concentrations of these acids in solution were in the range of about 0.01 g./100 ml. Finally, two brass strips (½″ x 3″) were immersed in the solutions in each flask, and air was bubbled through the solutions at a rate of 20–30 ml./min. for a period of 72 hours while the temperature was maintained at 70° C. The weight losses from the brass strips were as follows:

TABLE V.—EVALUATION OF "EXTRACT ACIDS" AS CORROSION INHIBITORS

| Inhibitor | Weight loss [1] | | Inch/yr. |
|---|---|---|---|
| | Grams | Percent | |
| None | 0.0270 | 1.98 | 0.0080 |
| Extract acid #1 [2] | 0.0025 | 0.18 | 0.0008 |
| Extract acid #2 | 0.0017 | 0.15 | 0.0003 |
| Extract acid #3 | 0.0026 | 0.18 | 0.0008 |
| Phthalic anhydride | 0.0100 | 0.90 | 0.0033 |

[1] Average of two coupons.
[2] Extract acid prepared by the method of Example I; acid number, 218; mol. weight, 420; unsaponifiable, 8.7%.

Extract acids Nos. 2 and 3 were prepared in accordance with copending application Serial No. 161,355, by gradual acidification of the carbonated mixture to recover acid fractions having acid numbers of 161 and 325 respectively. Carboxylic acids and fractions thereof having acid numbers of between about 160 to 350 are particularly useful as corrosion inhibitors, as one feature of this invention.

Phthalic anhydride was used (see Table V) as a representative, comparable, dibasic, aromatic acid. The corrosion-inhibiting properties of both the acids and their salts, as shown by the experiments in Tables IV and V, is unexpected in view of the fact that organic acids and their salts generally are not corrosion inhibitors.

Accordingly, this invention is directed to the discovery that the acids derived from solvent extracts by metalation, carbonation and acidification, or salts thereof are corrosion inhibitors for metal surfaces in contact with aqueous media, particularly aqueous media which are aerated, and also aerated commercial detergent compositions. Any metal salt of the complex extract acids may be used and such metals as sodium, potassium, lithium, cesium, rubidium, calcium, magnesium, zinc, strontium, cadmium, barium, aluminum, zirconium, lead, copper, arsenic, antimony, bismuth, tin, chromium, molybdenum, tungsten, manganese, iron, cobalt, nickel, and mercury can be used as the metal portion of the salts. The salts of the extract acids are prepared by known methods and no difficulty is encountered in their preparation. It is only necessary to mix the extract acids with a salt of any of the foregoing metals at ambient temperatures, or with the application of heat, to prepare the desired salts. Aqueous solutions of solid salts such as nitrates, acetates, sulfates, halides, phosphates, carbonates, hydroxides, oxides, etc., of these metals may be used in the preparation.

The corrosion inhibitors of this invention are used in the same manner as prior art corrosion inhibitors are used to combat the deterioration of metal surfaces in contact with a corrosive environment. The metal surfaces to be protected may be ferrous metals, alloys, plated metals, tin, iron, aluminum, brass, copper, bearing metals, castings, machine parts and the like which are in contact with aqueous environments, aerated aqueous environments, or aerated aqueous commercial detergent environments. The corrosive atmospheres counteracted by the corrosion inhibitors of this invention may contain acids, alkali, salts, organic materials, solvents, water and emulsifiers, ordinary soaps, modern detergents, and the like. The corrosion inhibitors of this invention are particularly effective against the corrosive action of aerated aqueous solutions that are used in many processes, and are also particularly effective against the corrosive action of aqueous solutions of synthetic detergents and emulsifiers.

Examples of the synthetic detergents and emulsifiers that can be present in the aqueous environments to be protected by the corrosion inhibitors of this invention are dodecylbenzene sulfonic acid, salts of fatty acid tertiary amines, alkylaryl sulfonates, alkylaryl sulfonates having molecular weights of 465 to 480, alkylaryl polyether alcohols, polyglycol esters, disodium N-octadecylsulfosuccinamate, diamyl ester of sodium sulfosuccinic acid, alkali metal petroleum sulfonates, alkaline earth metal petroleum sulfonates, fatty amides, blends of alkalis and detergents, polyoxyethylated nonylphenols, polyoxyalkylene esters and sulfonates, and the like which are either of anionic, nonionic or cationic type. These detergents and emulsifiers are used in textile processing, electroplating, car washing, metal pickling, grease emulsifiers, emulsion paints, adhesives, cleaning compositions, dishwashing compositions, and the like. The corrosion inhibitors of this invention find application in the preparation, handling, and use of these types of detergent compositions.

This invention encompasses corrosion inhibitors prepared by the reaction of solvent extracts with an alkali metal followed by carbonation, with or without acidification, and corrosion inhibitors prepared by transformation of the acidified product to a partially or wholly neutralized salt. The invention also encompasses corrosion inhibitors of Formulae 1, 2 and 3 herein which can be summarized as compounds of the formula, $$R(COOA)_n$$

wherein R represents the complex nuclei derived from solvent extracts, A is hydrogen or the hydrogen equivalent of a metal, and $n$ has a value of 1 to 5 or more, and compounds of the formula,

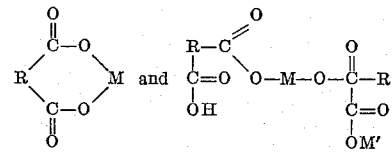

where M and M′ are the same or different metals.

The embodiments of the invention in which an exclusive property or privilege is claimed are defined as follows:

1. A detergent composition, non-corrosive to metal surfaces in contact therewith in the presence of air, consisting essentially of a major portion of a water-soluble detergent and emulsifying compound and as the sole corrosion-inhibiting component a minor but corrosion-inhibiting amount of a compound of the formula $$R(COOA)_n$$

wherein R represents the complex, polynuclear, aromatic and heterocyclic nucleus derived from solvent extracts obtained in the solvent extraction of mineral lubricating oils, characterized by having a molecular weight of about 300 to 750, containing about 0.5 to about 4.5 weight percent of combined sulfur and having an average of about 1.7 to about 3.5 aromatic rings per mean aromatic molecule, A is at least one substituent of the group consisting of hydrogen and a hydrogen equivalent of a metal, and $n$ has a value of 1 to 5.

2. A detergent composition in accordance with claim 1 consisting essentially of an aqueous solution of said detergent and emulsifying compound containing about 0.001 to 0.1 g. of said corrosion-inhibiting component per 100 ml. of said aqueous detergent solution.

3. A detergent composition in accordance with claim 1 in which A is hydrogen.

4. A detergent composition in accordance with claim 3 in which said corrosion inhibiting component has the following properties:

| Property: | Value |
|---|---|
| Acid number | 200–280 |
| Melting points, ° C. | 80–90 |
| Bromine No. | 16–24 |
| Percent sulfur | 1.7–2.3 |
| Color | Deep red |
| Percent unsaponifiables | 2–6 |

5. A detergent composition in accordance with claim 1 in which A is the hydrogen equivalent of a metal.

6. A detergent composition in accordance with claim 5 in which A is an alkali metal.

7. A detergent composition in accordance with claim 6 in which A is sodium.

8. A detergent composition in accordance with claim 5 in which A is mercury.

9. A detergent composition in accordance with claim 5 in which A is copper.

10. A detergent composition in accordance with claim 2 in which said detergent and emulsifying compound comprises mixed alkylaryl sulfonates.

References Cited by the Examiner

Baker et al.: Polar Type Rust Inhibitors, Ind. and Eng. Chem., January 1949, pp. 137–144.

JULIUS GREENWALD, *Primary Examiner.*

JOSEPH R. LIBERMAN, *Examiner.*